(12) United States Patent
Kumar et al.

(10) Patent No.: US 8,554,616 B2
(45) Date of Patent: Oct. 8, 2013

(54) REMOTELY CONFIGURABLE MEDIA AND ADVERTISEMENT PLAYER AND METHODS OF MANUFACTURE AND OPERATION THEREOF

(75) Inventors: Senthil Kumar, Chennai (IN); Jayendra Panchapakesan, Chennai (IN)

(73) Assignee: Real Image Media Technologies, Ltd., Channai (IN)

( * ) Notice: Subject to any disclaimer, the term of this patent is extended or adjusted under 35 U.S.C. 154(b) by 3182 days.

(21) Appl. No.: 10/035,921

(22) Filed: Oct. 27, 2001

(65) Prior Publication Data

US 2003/0083940 A1    May 1, 2003

(51) Int. Cl.
*G06Q 30/00*    (2012.01)
(52) U.S. Cl.
USPC .................. 705/14.4; 705/14.5; 705/14.53
(58) Field of Classification Search
USPC .................................. 705/14.4, 14.5, 14.53
See application file for complete search history.

(56) References Cited

U.S. PATENT DOCUMENTS

| | | | | |
|---|---|---|---|---|
| 5,774,170 A | * | 6/1998 | Hite et al. | 725/34 |
| 5,854,897 A | * | 12/1998 | Radziewicz et al. | 709/224 |
| 6,038,545 A | * | 3/2000 | Mandeberg et al. | 705/15 |
| 2002/0054087 A1 | * | 5/2002 | Noll et al. | 345/744 |

* cited by examiner

*Primary Examiner* — John Van Bramer

(57) ABSTRACT

For use with a computer network, a media and advertisement player, a method of manufacturing the player and a method of playing media and advertisements and reporting the playing of the media and advertisements to a remote system. In one embodiment, the player includes: (1) a media player that receives media from a remote system via the computer network and plays the media in response to customer requests, (2) an advertisement player that receives advertisements and a corresponding advertising schedule from the remote system via the computer network and plays the advertisements according to the advertising schedule and (3) a tracking subsystem that generates as-run logs containing records of a playing of the media and the advertisements and transmits the as-run logs to the remote system via the computer network.

21 Claims, 18 Drawing Sheets

REMOTELY CONFIGURABLE MEDIA AND ADVERTISEMENT PLAYER AND METHODS OF MANUFACTURE AND OPERATION THEREOF

TECHNICAL FIELD OF THE INVENTION

The present invention is directed, in general, to computers and, more specifically, to a remotely configurable media and advertisement player, a method of manufacturing the player and a method of operating such player to play media and advertisements and report the media and advertisements it plays to a remote system.

BACKGROUND OF THE INVENTION

Since at least the 1940s, jukeboxes have provided musical entertainment to patrons of diners, skating rinks, bowling alleys and bars. The classic jukebox, perhaps most typified by the iconic Wurlitzer®, contains a bunch of records, a written menu of songs to choose from, a coin slot in which to put your money and a song selector (usually a series of lettered or numbered buttons) that allows customers to select the songs they want to hear. Most jukeboxes not only give their customers music, but also a visual show in the form of colored lights or bubbling liquid and a chance to see the record of your choice being retrieved and loaded onto a turntable, all presented under glass.

As times have changed, so have jukeboxes. Later models have become somewhat less elaborate, trading eclectic details for utilitarian efficiency and a more low-key appearance. Gone, too, are the visible records, replaced with compact discs (CDs) of infinitely better quality, and perhaps far less style. In fact, since the mechanisms that load and play CDs are not as interesting to watch in motion, they are now often hidden.

The unfortunate result is that jukeboxes are neither as prominent nor as popular as they once were. Though they can still be found in all manner of commercial establishment, they may go hours without a single play. This lack of interest and finance will, over time, cause their demise.

In addition to the fading romantic aspects of jukeboxes are other disadvantages. First, jukeboxes are large, cumbersome units. Not only must they contain the records or CDs they are to play, but they must also contain the loading and playing mechanisms, which are often bulky.

Second, these records or CDs have to be rotated out over time. True, classic songs (so-called "oldies") never seem to age, but most songs are popular for only a while. Accordingly, people must be hired, trained and tasked with traveling to each establishment to change out records or CDs, update menus and collect quarters from coinboxes.

Third, these or other people must be trained to diagnose and repair broken jukeboxes. The same mechanisms that are so entertaining to watch in action are enormously complex, and therefore break down regularly. Maintaining these mechanisms in proper operating condition is a constant and expensive challenge.

Fourth, a given jukebox can hold only so many records or CDs. Therefore, the menu of songs to choose from is necessarily limited. If someone does not find the song he likes, he may walk away and not select another. Dissatisfied customers cannot help but hurt the revenue a jukebox is expected to make.

Finally, jukeboxes require their customers to pay to hear their music. A "play" costs only pocket change, but that is a lot of money to some customers. Other customers may be better heeled, but may not happen to have change on them at the time. Other customers just cannot be bothered.

Owners have a financial incentive to put a jukebox in their establishment, because they get a share of the profits. Unfortunately, as jukebox revenue has declined and operating expense has stayed high, the owners' shares have diminished. Unable to provide adequate compensation for establishment owners, jukeboxes are unlikely to continue to justify the space they require.

Accordingly, what is needed in the art is a fundamentally new kind of entertainment system to replace the venerable jukebox. More specifically, what is needed is a new media (e.g., audio music, music videos, nonmusic entertainment or nonentertainment information) player and a new way of paying for media play.

SUMMARY OF THE INVENTION

To address the above-discussed deficiencies of the prior art, the present invention provides, for use with a computer network, a media and advertisement player, a method of manufacturing the player and a method of playing media and advertisements and reporting the playing of the media and advertisements to a remote system. In one embodiment, the player includes: (1) a media player that receives media from a remote system via the computer network and plays the media in response to customer requests, (2) an advertisement player that receives advertisements and a corresponding advertising schedule from the remote system via the computer network and plays the advertisements according to the advertising schedule and (3) a tracking subsystem that generates as-run logs containing records of a playing of the media and the advertisements and transmits the as-run logs to the remote system via the computer network.

The present invention therefore introduces a player capable of playing of both media and advertisements. In contrast to the conventional jukebox, media and advertisements are downloadable from a computer network, and therefore remotely undatable. The advertisements are played according to an advertising schedule contained in the player. The playing of the media and the advertisements are tracked by generating as-run logs, which are made available to the remote system.

The embodiment above is capable of providing an advertisement-supported media play service. In another embodiment of the present invention, the advertisement player is supplemented or replaced with a means for receiving a payment from the customer or the establishment. Cash or credit can therefore be employed to pay for media play in certain establishments.

In one embodiment of the present invention, the system further includes a display that presents a graphical user interface (GUI). In a more specific embodiment, the GUI has a skin that is received from the remote system via the computer network. In a more specific embodiment, the display is touch-sensitive. While the combination of GUI and touch-sensitive screen (providing soft buttons) yields a particularly flexible and remotely configurable player, those skilled in the pertinent art will understand that hardcopy menus, a textual interface and hard buttons are within the broad scope of the present invention.

In one embodiment of the present invention, the advertising schedule is dependent upon plays of the media. Certain advertisements may play before or after certain media are selected by a customer. Certain other advertisements may not be allowed to play in the context of other media. Those skilled in the art will readily perceive the advantages of media-dependent advertising placement. Of course, the broad scope of the present invention is not limited to media-dependent advertising schedules.

In one embodiment of the present invention, the system comprises a PC and the media and the advertisements are stored on a hard disk drive of the PC. It is highly advantageous to embody the player of the present invention in an otherwise conventional PC, both to save the cost of designing custom hardware and operating system and application software and to maintain maximum flexibility and configurability. Those skilled in the art will understand, however, that custom hardware and/or software are within the broad scope of the present invention.

In one embodiment of the present invention, the computer network is the Internet. Those skilled in the pertinent art should understand, however, that the computer network could be any suitable network that can couple the player to the remote system.

In one embodiment of the present invention, the media and advertisement player is capable of conducting surveys, conducting contests and the like with customers. This allows customers to give overt opinion feedback, perhaps regarding the media, the advertisements or the establishment in which a particular remote player is located. This further allows customers to take part in contests, perhaps to win prizes or credits at the particular establishment they are patronizing. Data regarding the surveys, contests and the like can be received from the remote system. Of course, this capability need not be present to fall within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIGS. 4 through 19 illustrate various exemplary screenshots for the media and advertisement player of FIG. 1;

DETAILED DESCRIPTION

Figure 1:
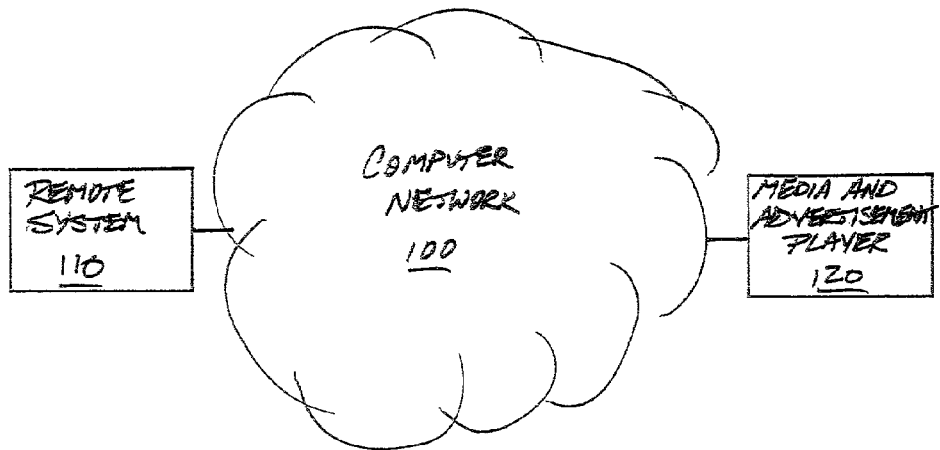
FIG. 1 illustrates a block diagram of a computer network, a remote system and a media and advertisement player constructed according to the principles of the present invention.

Referring initially to FIG. 1, illustrated is a block diagram of a computer network 100, a remote system 110 and a media and advertisement player 120 constructed according to the principles of the present invention.

The computer network 100 is environmental to the media and advertisement player 120 of the present invention and is responsible for providing connectivity between the media and advertisement player 120 and the remote system 110. The computer network 100 may be the Internet, an intranet, extranet, dial-up connection or other computer network. In the illustrated embodiment, the remote system 110 takes the form of a centralized system capable of sporadically connecting to a number of media and advertisement players.

The remote system 110 is responsible for several important functions that are environmental to the media and advertisement player 120 of the present invention. Overall, the remote system 110 coordinates the operation of the various media and advertisement players with which it interacts.

More specifically, the remote system 110 allows media and advertisements (each typically in the form of discrete files) to be generated, modified and stored. For purposes of the present invention, "media" is defined broadly to include audio music, music videos, nonmusic entertainment or nonentertainment information, such as text, graphics or computer data. Further, while the media contained in the remote system 110 of FIG. 1 is meant to be entertaining, the broad definition of "media" includes informational or educational content, or any other content that may be desired to distribute to remote players. "Media" is not, however, defined to include advertisements, which are pitches for products or services that an advertiser pays to play. Implicit in this distinction is that customers choose to play media and generally only tolerate the playing of advertisements.

The remote system 110 also allows playback rules to be generated, modified and stored. Playback rules govern how the media is distributed to the various media and advertisement players with which the remote system 110 interacts. Playback rules include aspects selected from the group consisting of: (1) geographic location of the media and advertisement players, (2) establishment type in which the media and advertisement players are located, (3) demographics of establishment in which the media and advertisement players are located, (4) media playback history for the media and advertisement players, (5) time of day, (6) date, (7) day of week, (8) month of year and (9) season of year.

It is anticipated that the media and advertisement players constructed in accordance with the principles of the present invention will be located in a wide variety of commercial establishments located over a wide geographical area, perhaps spanning many countries and continents. What is popular in an Akron, Ohio, bowling alley may not be appreciated in a Moscow, Russia, bar or a Nile Valley, Egypt, rest stop. What may be popular in the Akron, Ohio, bowling alley at Christmastime may be quite out of date in July. Revelrous nighttime videos in the Moscow bar may be inappropriate for the sober morning. Songs describing in-flight violence are wholly improper for airport terminals.

Accordingly, playback rules are designed to govern (1) which media is loaded into which media and advertisement players and (2) when the media is loaded. For example, a media and advertisement player in an American college student union may receive a heavy dose of modern pop music (currently comprising Jennifer Lopez, Nine Inch Nails, Britney Spears, Limp Bizkit and the artist formerly known as the artist formerly known as Prince). As particular songs by those artists come and go, and as new artists come into popularity, the playback rules are modified to cause corresponding new media to be loaded into that particular media and advertisement player. During December, several Christmas or Hanukkah songs may be in order and therefore incorporated into the playback schedule. Once the holidays are over, however, those songs will surely be supplanted with a less seasonal fare. Slower songs may be made available for weekday play than for weekend play (the better to study).

Playback rules can be dynamic. The remote server may adjust the playback rules based on the media play information. As one example, a song that is played often on one media and advertisement player and therefore popular at one particular establishment may be held over for a period of time, even though that song is replaced at other media and advertisement players in other establishments. A Cole Porter song that has long since rotated out of most diners in the Baltimore, Md., area may still be wildly popular in one diner for reasons unknown. This fact can be ascertained and used to extend the run of that song. The as-run logs gives a history of media play, and can be employed to advantage to monitor the popularity of media or genres of media so playback rules can be adjusted to advantage.

Though more examples of location-, time- and feedback-dependent playback rules could certainly be given, those skilled in the art will understand from the above examples the nature and function of the playback rules. Particular applications of the principles of the present invention may call for as many or as few playback rule types and playback rules as are felt to be necessary.

The remote system 110 also allows advertising schedules to be generated, modified and stored. Advertising schedules govern how the advertisements are distributed to the various media and advertisement players with which the remote system 110 interacts and further when or under what circumstances those media and advertisement players play particular advertisements.

In one sense, advertisements are like media. Accordingly, the advertising schedules may be based on aspects selected from the group consisting of: (1) geographic location of the media and advertisement players, (2) establishment type in which the media and advertisement players are located, (3) demographics of establishment in which the media and advertisement players are located, (4) time of day, (5) date, (6) day of week, (7) month of year and (8) season of year. In addition, however, advertisements may have additional considerations. Some sets of advertisements are episodic, and therefore should be played in sequence. Further, some advertisements are most effective when played in context or not played at certain times. Proximity to particular media being played may be one germane aspect. For example, an advertisement for a Slim Whitman album may be most effectively played proximate the playing of a requested Slim Whitman song. An advertisement for a skateboard may, however, not be demographically consonant with that same Slim Whitman song.

The advertising rules may be restrictive, preferential or nonrestrictive. In other words, one advertising rule may call for a particular advertisement not to be played at some times or under some circumstances (restrictive). Another advertising rule may prefer that a particular advertisement be played proximate the playing of some particular piece of media (preferential). Yet another advertising rule may allow an advertisement to be played anywhere at any time (nonrestrictive).

In deciding what the ultimate advertising schedules are to be, a person (manually) or the remote system 110 itself (automatically) assigns advertisements that are subject to the most restrictive advertising rules first, followed by those subjected to ever less restrictive advertising rules, and finally followed by those that are least restricted. Those skilled in the pertinent art will understand that the particular technique by which advertisements are assigned is not important to the present invention.

In fact, the advertisement server may adjust the advertising schedules based on the advertisement play information retrieved from the as-run logs of the various media and advertisement players with which the remote system 110 interacts. Advertisers are almost always involved in the process of determining when, where, how often, and in what context their advertisements are played. By retrieving advertisement play information from the media and advertisement players, the remote system 110 can optionally modify advertising schedules. Of course, those skilled in the pertinent art should understand that the advertisement schedules could be independent of retrieved advertisement play information.

The remote system also allows skins and corresponding skin selection rules to be generated, modified and stored. In GUI parlance, a "skin" is the particular look and feel that an interface can present to a user. A given application, for example, may have several alternative "skins." Each skin usually presents the same information and user functions to a user, but may have a wholly different look. In this sense, a skin may be thought of as a personality.

It is fully contemplated that the media and advertisement players with which the remote system 110 interacts may have GUIs capable of taking on alternative skins. This can be highly advantageous in allowing the media and advertisement players to adapt or update their looks as appropriate. For example, some or all media and advertisement players could adopt a Valentine's Day skin on February 14 (perhaps an overall pink motif with red, heart-shaped touch-sensitive soft buttons). However, when Valentine's Day is over, the holiday skin is discarded in favor of a more generic skin, perhaps one directed more generally to winter.

The remote system 110 simply treats skins as a special type of media, distributing skin data to the media and advertisement players according to skin selection rules. The skin selection rules, like the playback rules, may include aspects selected from the group consisting of: (1) geographic location of the media and advertisement players, (2) establishment type in which the media and advertisement players are located, (3) demographics of establishment in which the media and advertisement players are located, (4) media playback history for the media and advertisement players, (5) time of day, (6) date, (7) day of week, (8) month of year and (9) season of year.

The remote system 110 is further capable of receiving and compiling reports from as-run logs that the media and advertisement players with which it interacts occasionally transmits to it. The structure and function of the as-run logs will be described in greater detail below.

The various servers, clusters, workstations that may comprise the remote system 110 and networking hardware that join them together, along with operating system and application (such as database and transaction) software are conventional. In the illustrated embodiment, Microsoft® Windows® is the operating system of choice, though those skilled in the pertinent art will readily see that other operating systems are capable of supporting the system of the present invention.

Figure 2:
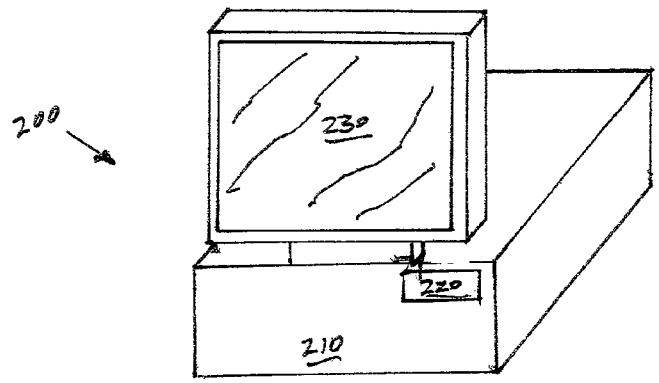
FIG. 2 illustrates a block diagram of a multimedia PC that can form an environment within which the media and advertisement player of FIG. 1 can operate.

Turning now to FIG. 2, illustrated is a block diagram of a multimedia PC, generally designated 200, that can form an environment within which the media and advertisement player of FIG. 1 can operate. The multimedia-capable PC 200 includes a main chassis 210.

The hardware contents of the main chassis 210 are largely hidden, and thus will be described but not shown. The main chassis 210 includes a central processing unit (CPU), typically mounted on a motherboard that provides essential hardware support functions to the CPU. A power supply provides power to the motherboard and to various daughterboards that are coupled to the motherboard and provide more specialized functions not provided by the motherboard. One of the daughterboards present in the multimedia-capable PC 200 is a sound card. The sound card conventionally receives a stream of data representing sounds and generates from that stream an analog signal that may be provided to one or more amplifiers.

The role of the sound card relative to the media and advertisement player 120 is to receive and play data streams representing media requested to be played by customers and advertisements selected for play by the media and advertisement player 120 in accordance with the advertising schedule provided to the media and advertisement player 120 by the remote system 110 of FIG. 1.

The multimedia-capable PC further includes one or more hard disk drives (one of which being visible and thus designated as 220). The role of the hard disk drive 220 relative to the media and advertisement player 120 is to store the PC's operating system, the application program that makes the PC into the media and advertisement player 120, the various media and advertisements received from the remote system 110, the advertising schedule and (optional) skin received from the remote system 110 and the as-run log that the media and advertisement player 120 builds over time for eventual uploading to the remote system 110.

Another daughterboard, a graphics daughterboard, drives a touch-sensitive display 230 that is coupled to the main chassis 210. The touch-sensitive display 230 is a conventional device. The role of the touch-sensitive display 230 relative to the media and advertisement player 120 is to receive input from a customer by sensing pressure at locations about its screen. The touch-sensitive display 230 also receives graphical output from the graphics daughterboard to display the skin, menus of media selections that are available to a customer, prompts to help confused customers, any visual components of media (such as music videos), any visual components of advertisements and special password-protected maintenance, diagnostic or report screens.

The multimedia-capable PC also includes a network communication device, such as a modem or network daughterboard, which can be used to connect to the remote system 110 of FIG. 1 either through a direct, dial-up connection or indirectly through the computer network 100 of FIG. 1. The role of the network communication device relative to the media and advertisement player 120 is to download media, advertisements, schedules and skins from the remote system 100 and upload as-run logs or other required information to the remote system 100. These downloads and uploads ("sessions") may take place when the media and advertisement player 120 is not as active in playing back media or advertisements, may take place in short segments over time, or in the background, however may be appropriate to the capabilities of the multimedia-capable PC 200.

The as-run logs are straightforward. They include records for each piece of media or advertisement that is played. Each record contains an identification field that identifies the media or the advertisement. A date field identifies the date on which the media or advertisement was played. A time field identifies the time at which the media or advertisement was played. An error field indicates whether the play was with or without error. Other or fewer fields are certainly within the broad scope of the present invention.

Figure 3:
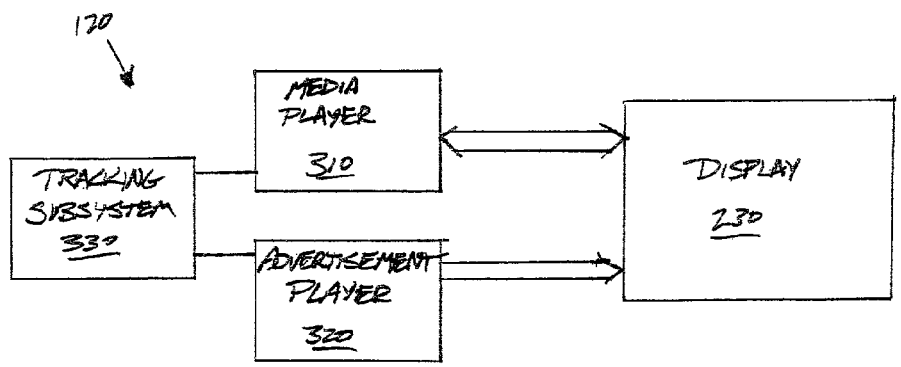
FIG. 3 illustrates a block diagram of a media and advertisement player constructed according to the principles of the present invention.

Turning now to FIG. 3, illustrated is a block diagram of the media and advertisement player 120 of FIG. 1. The media and advertisement player 120 includes a media player 310. The media player 310 is responsible for receiving media from a remote system via the computer network. The media player 310 is further responsible for playing the media in response to customer requests.

The media and advertisement player 120 further includes an advertisement player 320. The advertisement player 320 is responsible for receiving advertisements and a corresponding advertising schedule from the remote system via the computer network. The advertisement player 320 is further responsible for playing the advertisements according to the advertising schedule.

The media and advertisement player 120 still further includes a tracking subsystem 330. The tracking subsystem 330 is responsible for generating as-run logs containing records of a playing of the media and the advertisements. The tracking subsystem 330 is further responsible for transmitting the as-run logs to the remote system via the computer network.

The media and advertisement player 120 yet further includes a display 230 that presents a GUI. In the embodiment illustrated in FIG. 3, the GUI has a skin that is received from the remote system via the computer network and presents soft buttons to customers that can be used to select media and receive help.

Those skilled in the art should understand that the media and advertisement player 120 may not adopt the form factor of a desktop PC both for security and appearance reasons. Because a commercially viable player should be both resistant to tampering and attractive, the media and advertisement player 120 may advantageously take on the appearance of a freestanding or wall-mounted video kiosk.

Turning now to FIGS. 4 through 20, illustrated are various exemplary screenshots for the media and advertisement player of FIG. 1. Together, the screenshots illustrate the manner in which the media and advertisement player 120 presents itself to a typical customer. In reviewing FIGS. 4 through 20, one should bear in mind that the features presented therein are stylistically represented within the context of a particular skin. One skilled in the pertinent art should understand that the broad scope of the present invention extends substantially beyond the very specific embodiment illustrated. One skilled in the pertinent art should also understand that the screenshots of FIGS. 4 through 19 are but mere examples of what a media and advertisement player constructed according to the principles of the present invention is capable of displaying. Though not pertinent to the scope of the present invention, the illustrated and described screenshots are attributed to an embodiment given the name "QJam," which is simply a trademark that may be employed to designate the source of the player when it is commercially introduced.

Figure 4:
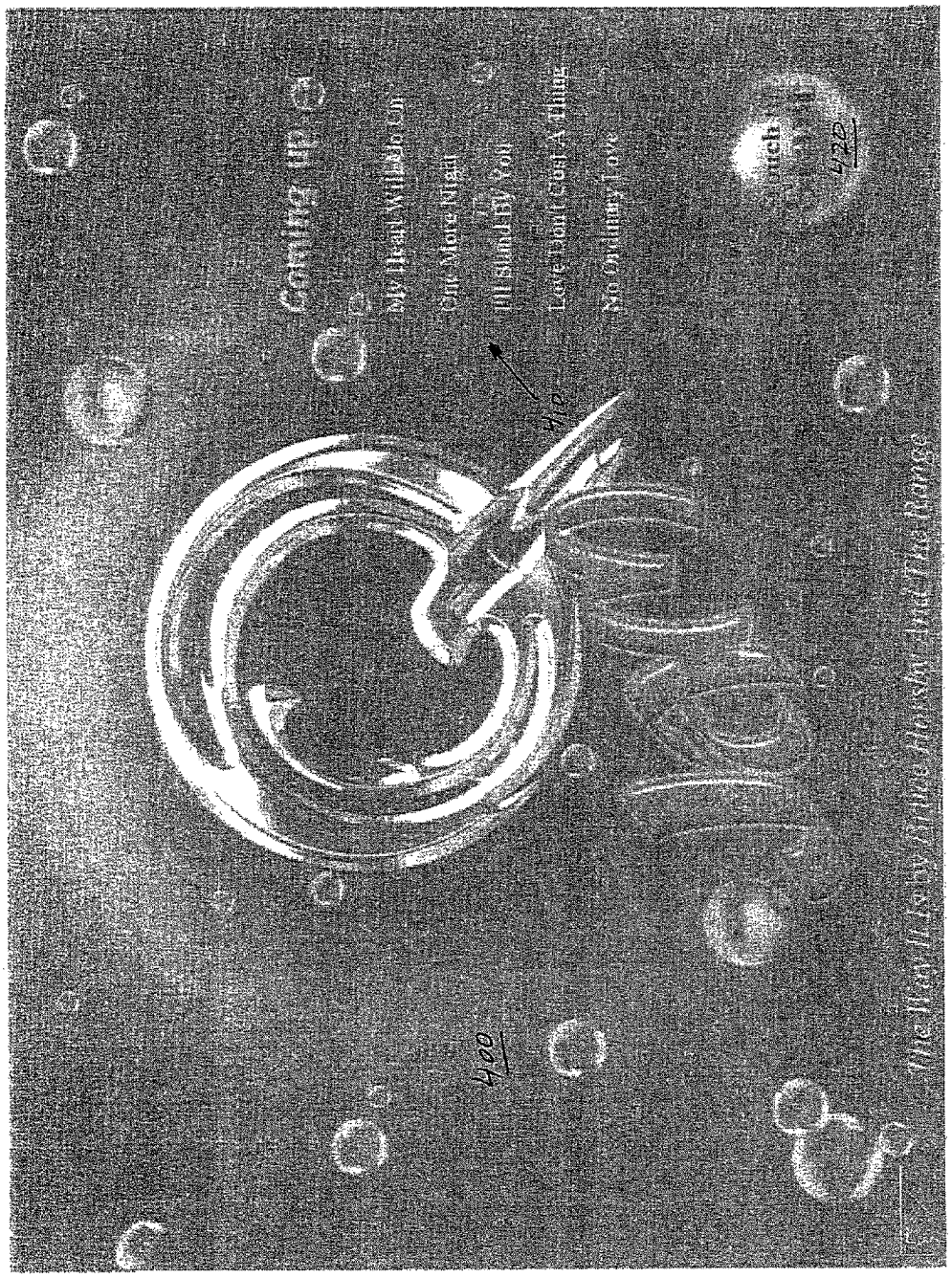
Figure 3:
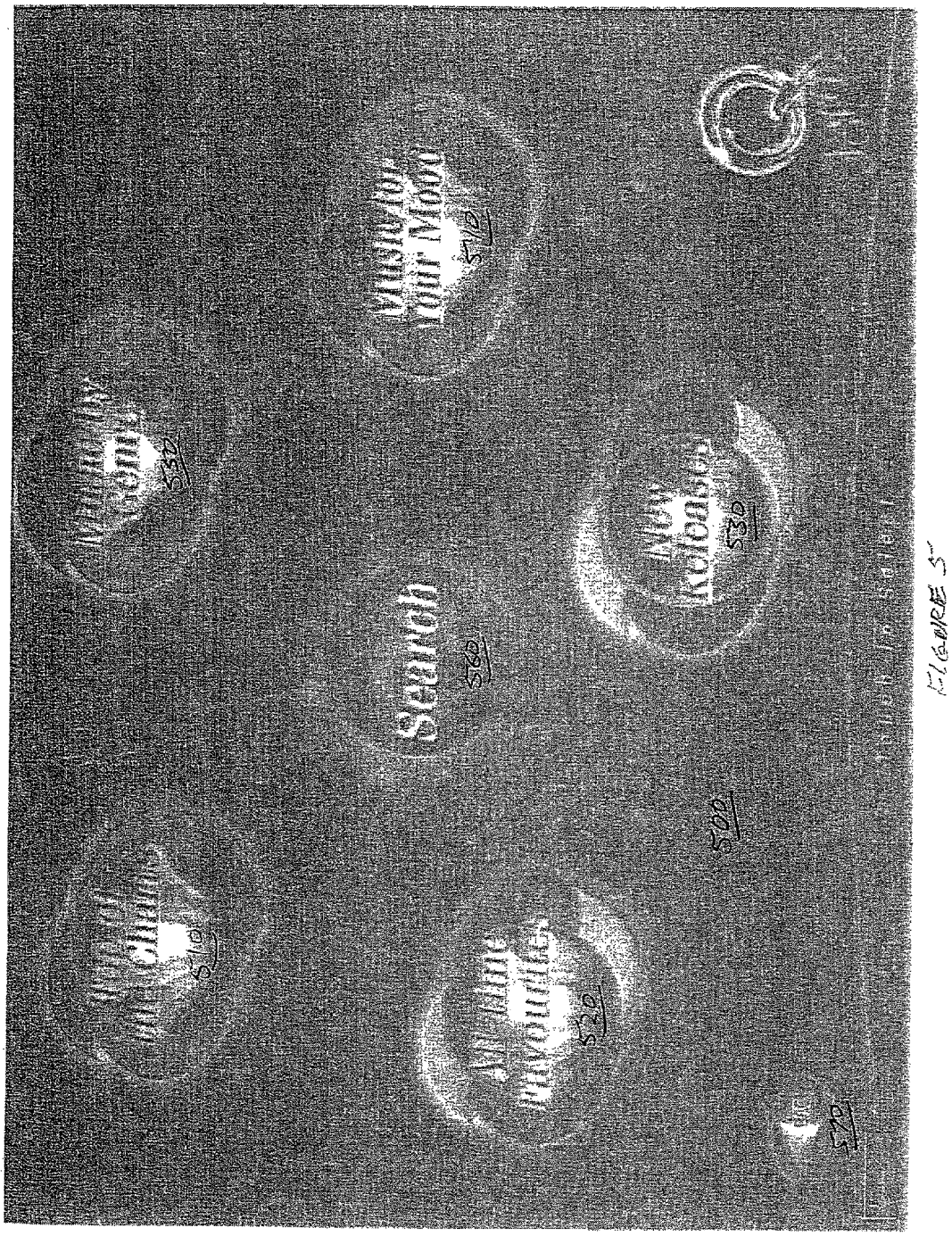

FIG. 4 illustrates an opening screen 400 which is normally presented when a customer is not in the process of selecting media to play. The opening screen 400 includes a list 410 of media that are queued to play and provides a start button 420 to allow a customer to touch to begin the process of selecting one or more pieces of media (e.g., songs) to play.

FIG. 5 illustrates a master menu screen 500 that is presented after the customer touches the start button 420 of FIG. 4. The master menu screen 500 includes a top-of-the-charts button 510, an all-time favourites button 520, a new releases button 530, a music-for-your-mood button 540, a music-by-genre button 550 and a search button 560. The customer may wish to go back to an earlier screen by pressing a back button 570.

Figure 6:
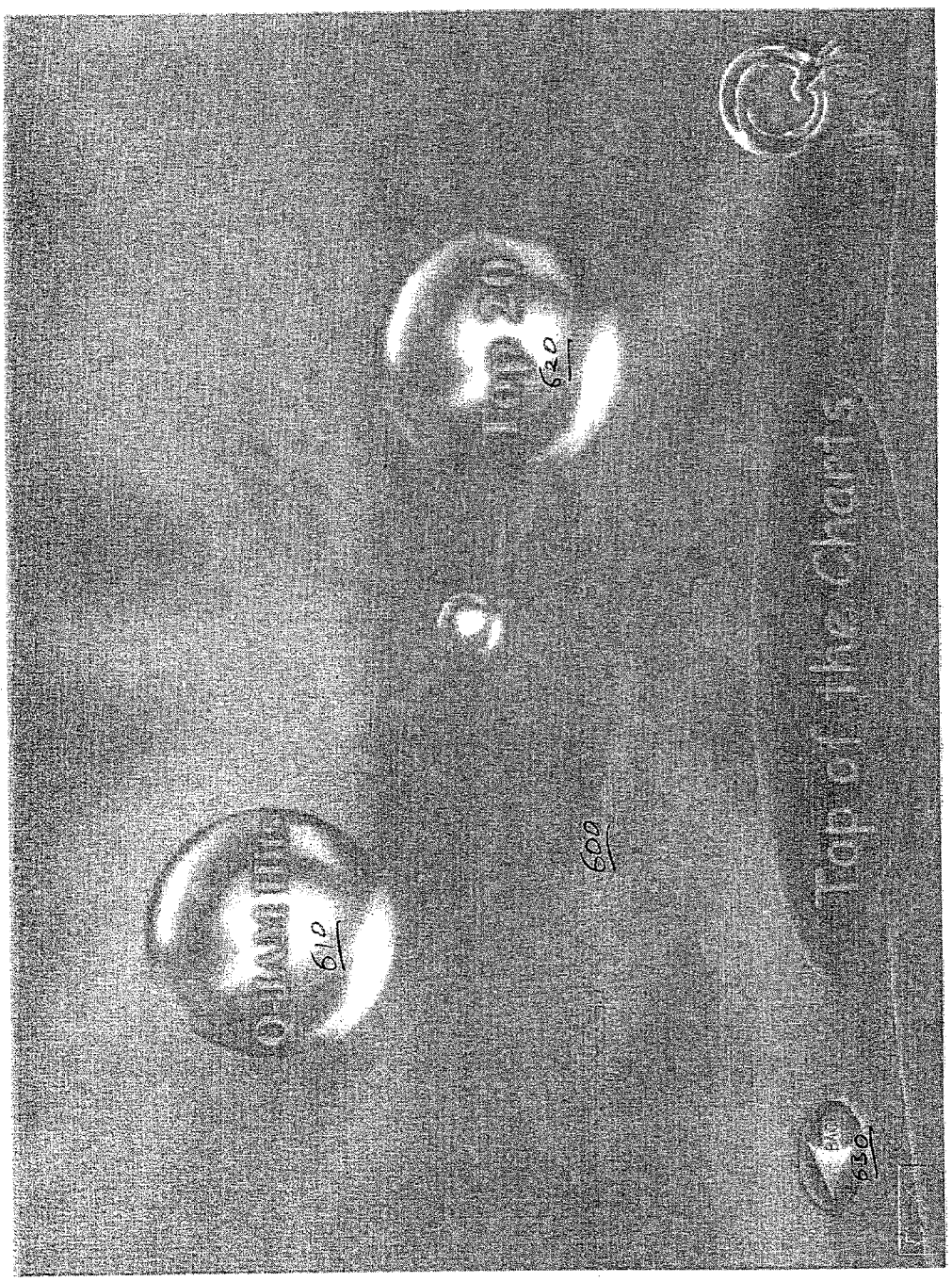

FIG. 6 illustrates a top-of-the-charts screen 600 that is presented after the customer touches the top-of-the-charts button 510 of FIG. 5. The top-of-the-charts screen 600 includes a QJam hits button 610 and a top 20 button 620. The customer may wish to go back to an earlier screen by pressing a back button 630.

Figure 7:
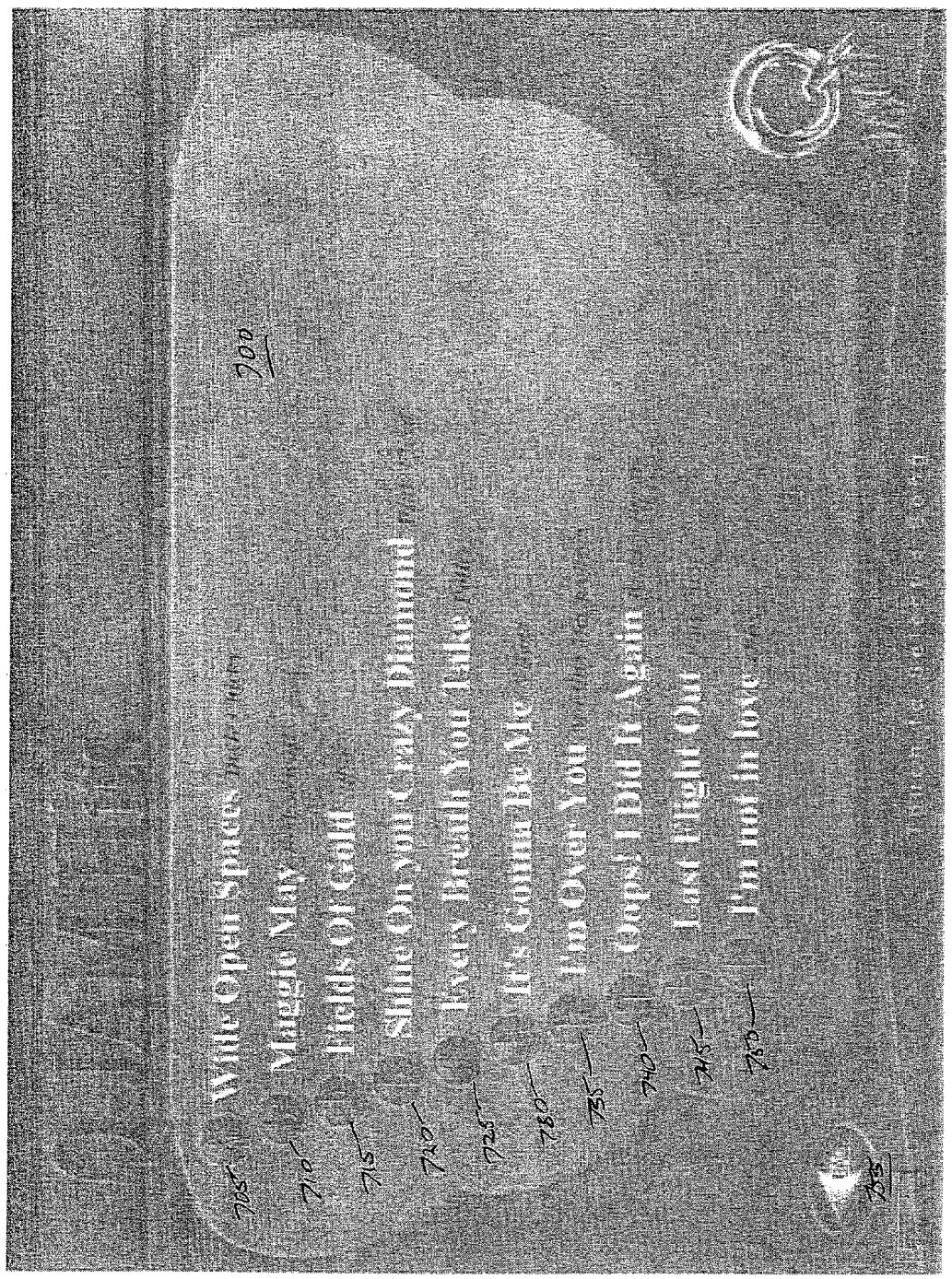

FIG. 7 illustrates a QJam hits screen 700 that is presented after the customer touches the QJam hits button 610 of FIG. 6. The QJam hits screen 700 includes buttons 705, 710, 715, 720, 725, 730, 735, 740, 745, 750 to select respective ones of the ten most popular songs on that particular media and advertisement player. The customer may wish to go back to an earlier screen by pressing a back button 755.

Figure 8:
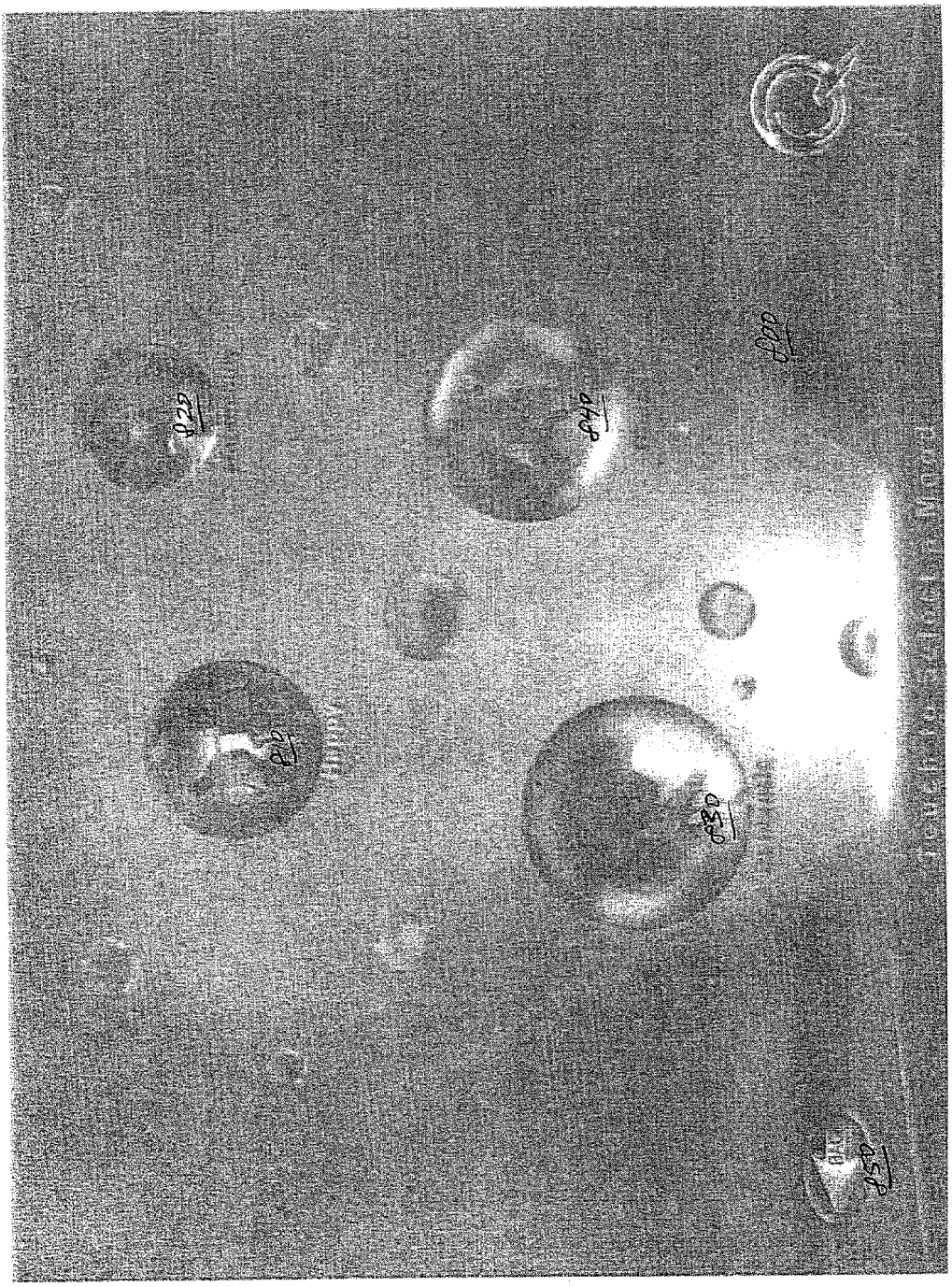

FIG. 8 illustrates a browse-by-mood screen 800 that is presented after the customer touches the music-for-your-mood button 540 of FIG. 5. The browse-by-mood screen 800 includes buttons 810, 820, 830, 840 to select media corresponding to happy, melancholy, romantic and dance moods. The customer may wish to go back to an earlier screen by pressing a back button 850.

Figure 9:
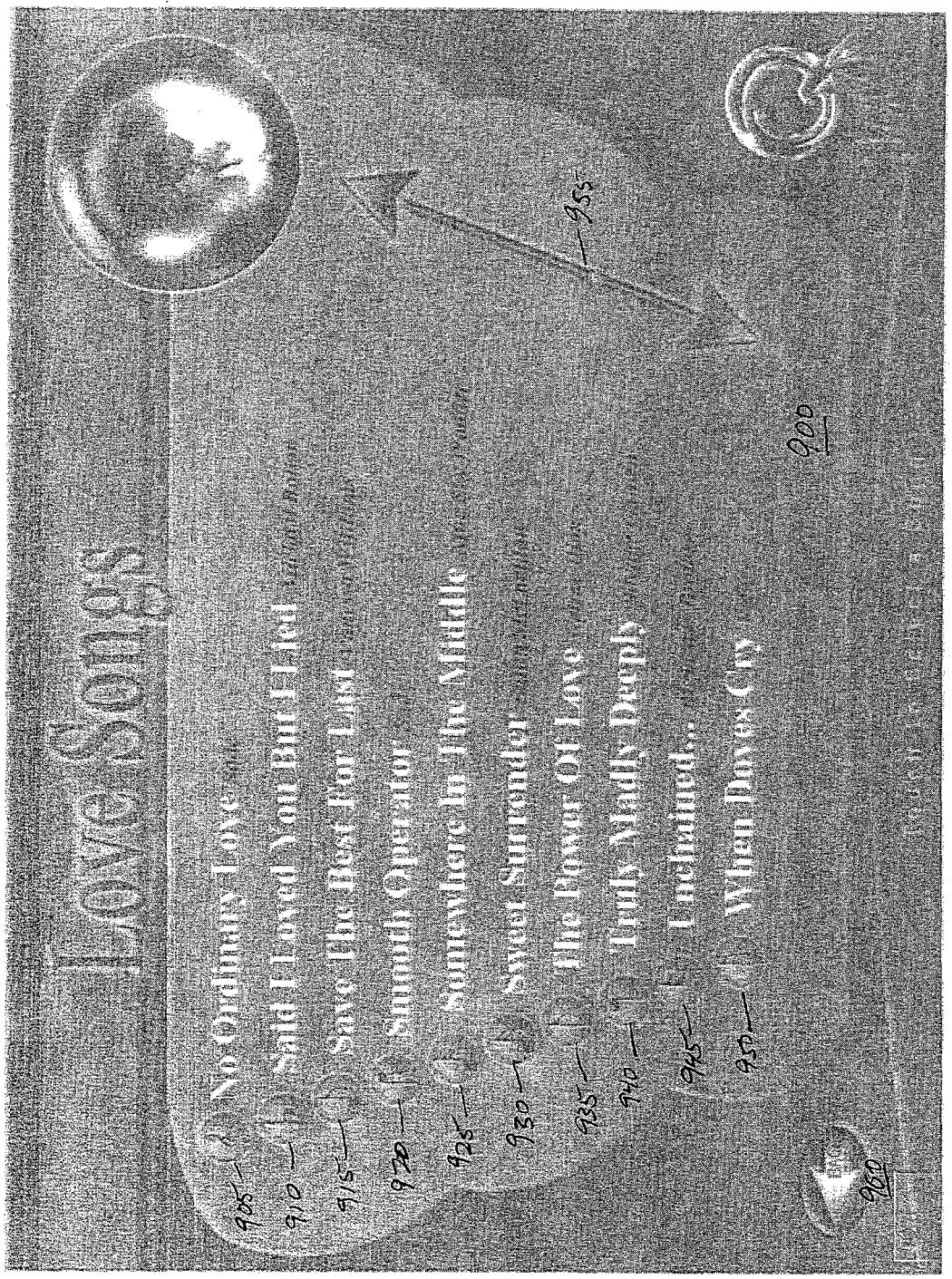

FIG. 9 illustrates a love songs screen 900 that is presented after the customer touches the button 830 of FIG. 8 corresponding to the romantic mood. The love songs screen 900 includes buttons 905, 910, 915, 920, 925, 930, 935, 940, 945, 950 to select respective ones of ten love songs. The love songs screen 900 further includes a slider 955 that the customer can drag to reveal further love songs. The customer may wish to go back to an earlier screen by pressing a back button 960.

Figure 10:
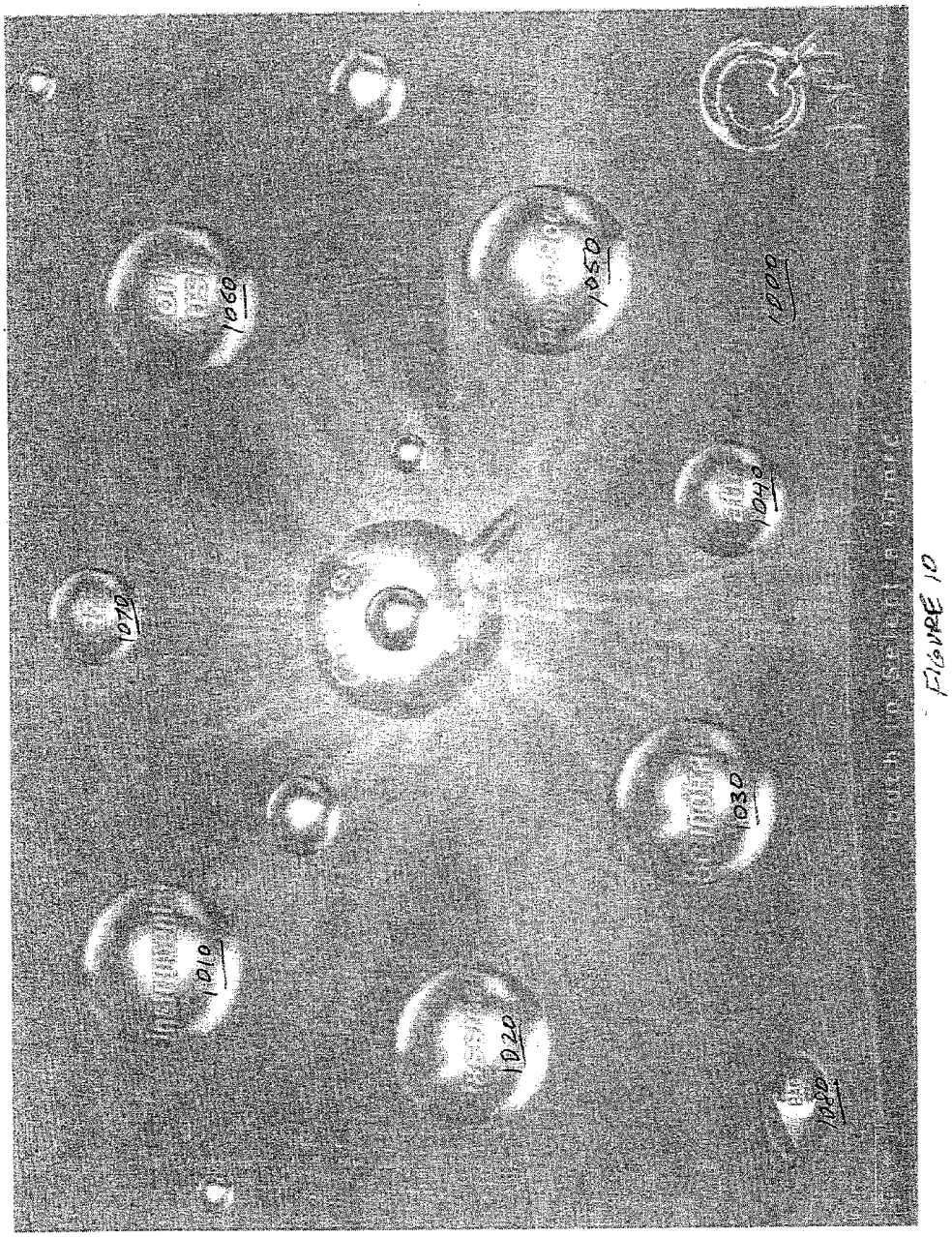

FIG. 10 illustrates a genres screen 1000 that is presented after the customer touches the music-by-genre button 550 of FIG. 5. The genres screen 1000 includes an instrumental button 1010, a classical button 1020, a soundtrack button 1030, a Latin button 1040, a pop-n-rock button 1050, a world music button 1060 and a jazz button 1070. The customer may wish to go back to an earlier screen by pressing a back button 1080.

Figure 11:
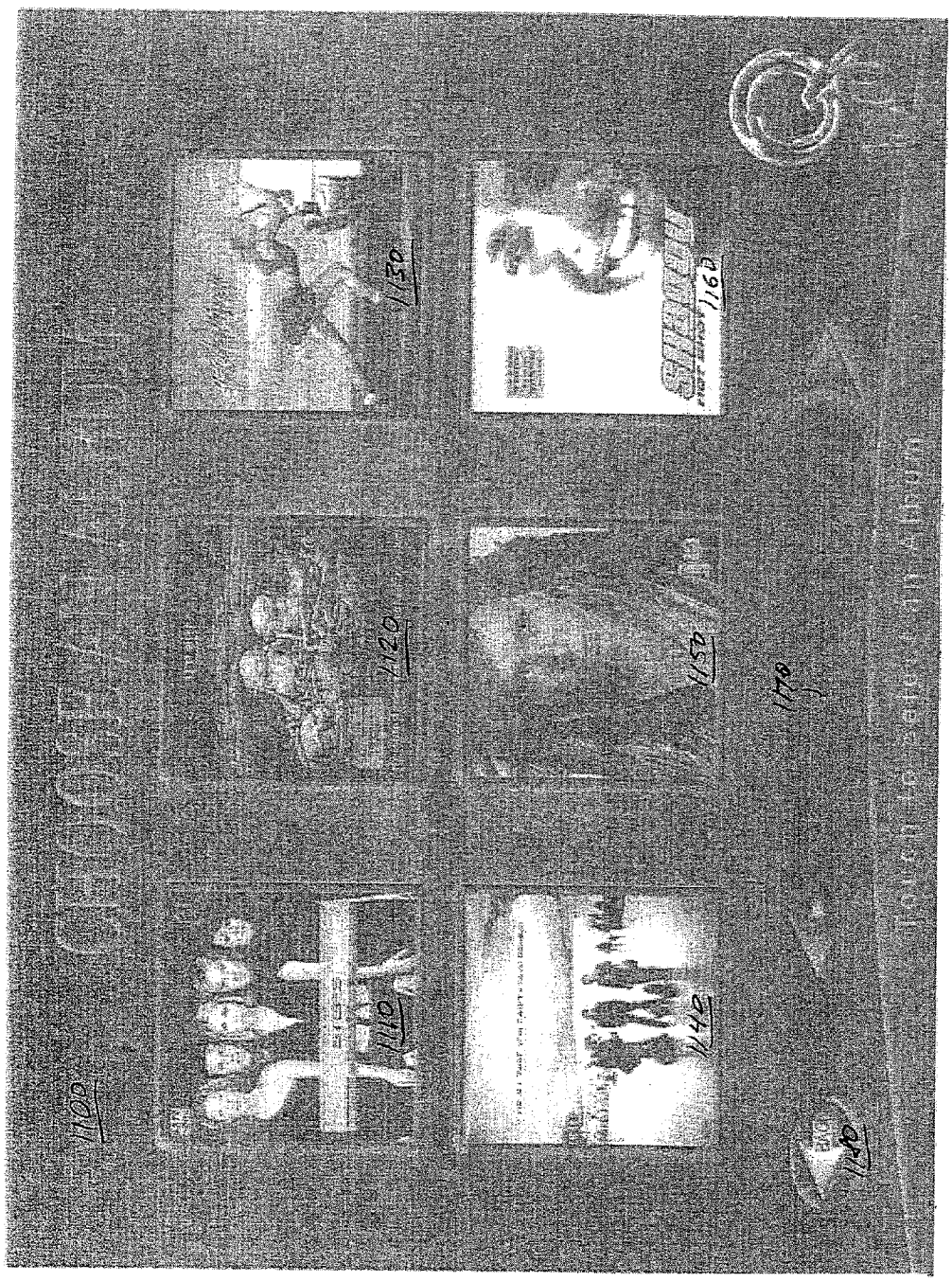

FIG. 11 illustrates a choose-an-album screen 1100 that is presented after the customer touches the new releases button 530 of FIG. 5. The choose-an-album screen 1100 presents images of six album covers, each of which is a button. Buttons 1110, 1120, 1130, 1140, 1150, 1160 are therefore each dedicated to one album. A slider 1170 can be dragged by the customer to reveal further album buttons. The customer may wish to go back to an earlier screen by pressing a back button 1180.

Figure 12:
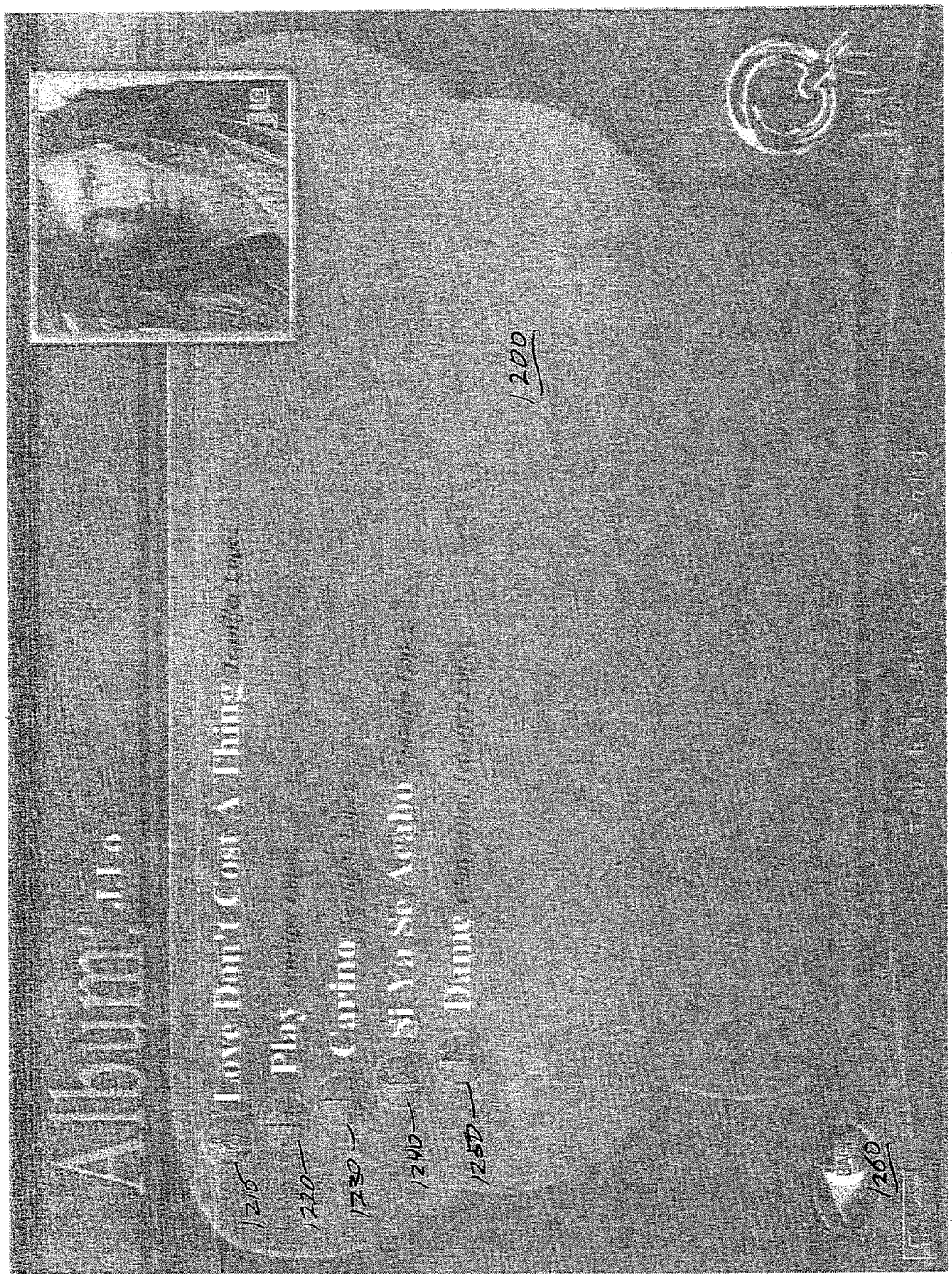

FIG. 12 illustrates an album-specific screen 1200 for the artist Jennifer Lopez that is presented after the customer touches the button 1150 of FIG. 11, corresponding to one of Ms. Lopez's albums, "J. Lo." The album specific screen 1200 includes buttons 1210, 1220, 1230, 1240, 1250 for each song on the J. Lo album that is available to be played on the particular media and advertisement player. The customer may wish to go back to an earlier screen by pressing a back button 1260.

Figure 13:
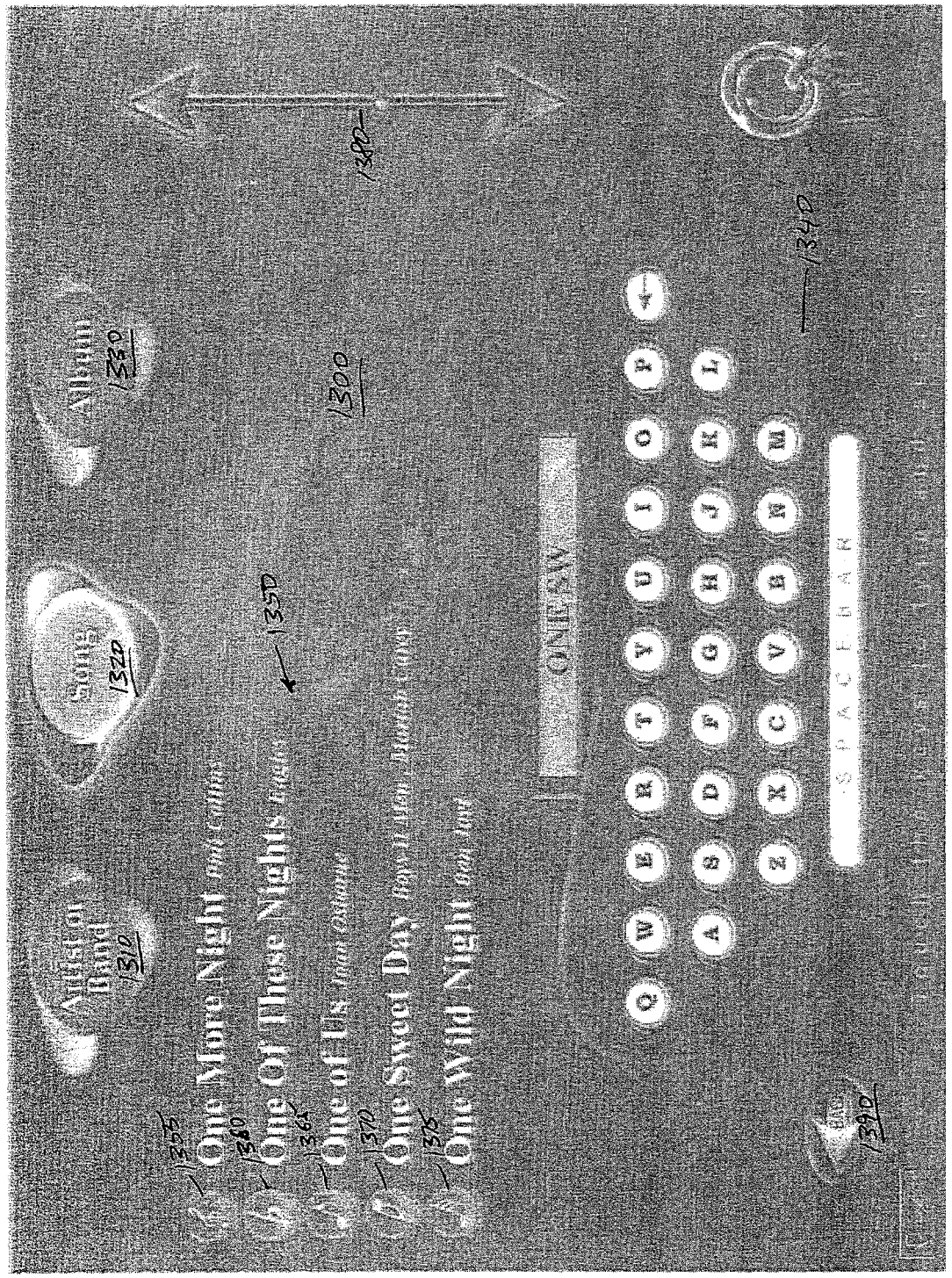

FIG. 13 illustrates a search screen 1300 that is presented after the customer touches the search button 560 of FIG. 5. The search screen 1300 allows searches to be conducted based on artist or band, song or album and therefore includes corresponding buttons 1310, 1320, 1330. Having selected the basis on which a search is to be conducted (song, in the case of FIG. 13), the customer can then employ a stylized keyboard 1340 to type in search terms. A list 1350 of media fitting the search terms includes corresponding buttons 1355, 1360, 1365, 1370, 1375. A slider 1380 can be dragged by the customer to reveal further items in the list 1350. The customer may wish to go back to an earlier screen by pressing a back button 1390.

Figure 14:
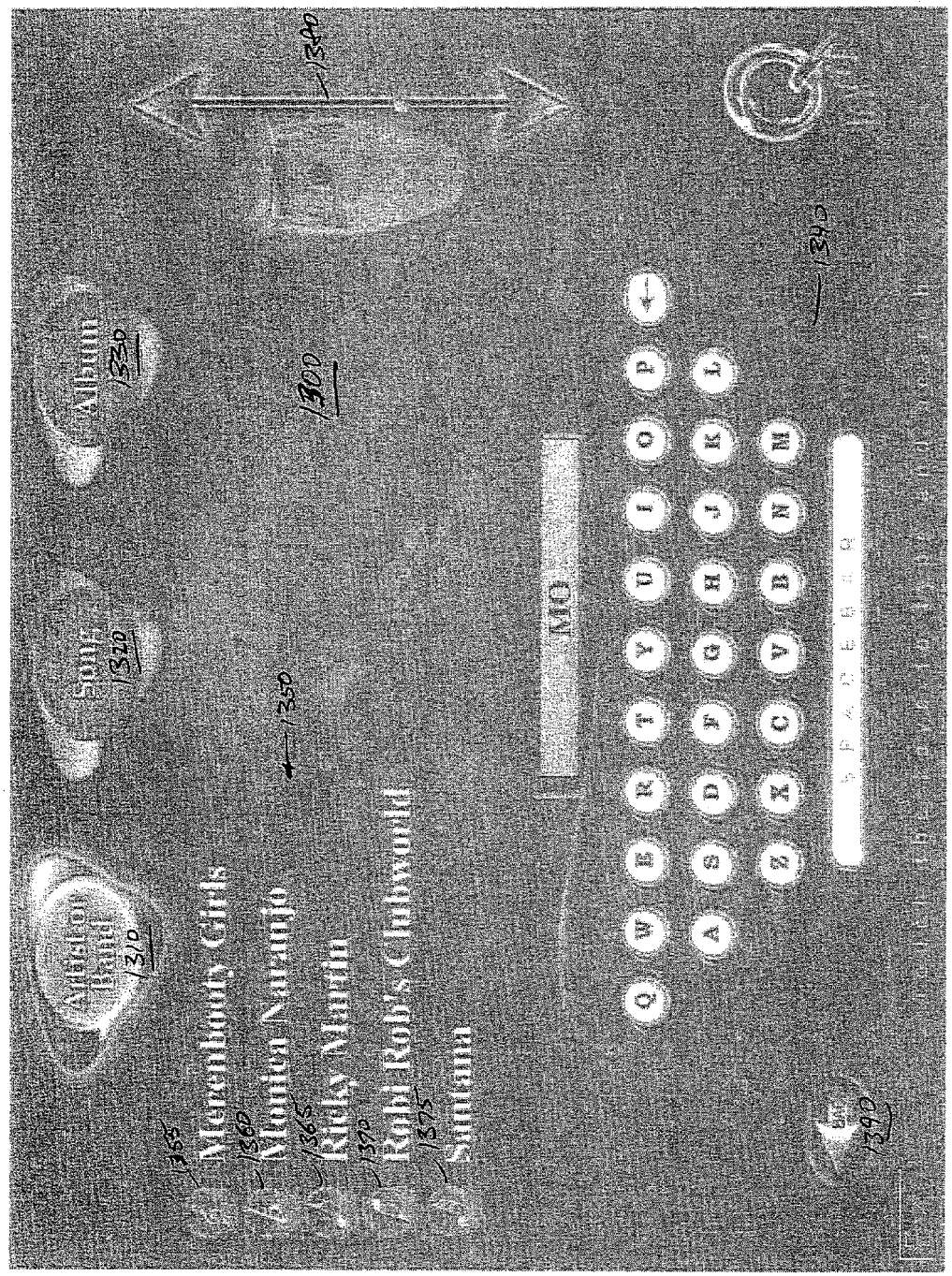

FIG. 14 illustrates the search screen 1300 of FIG. 13 in which a customer has chosen the artist or band basis upon which to conduct a search (the button 1310). Accordingly, the list 1350 contains different media.

Figure 15:
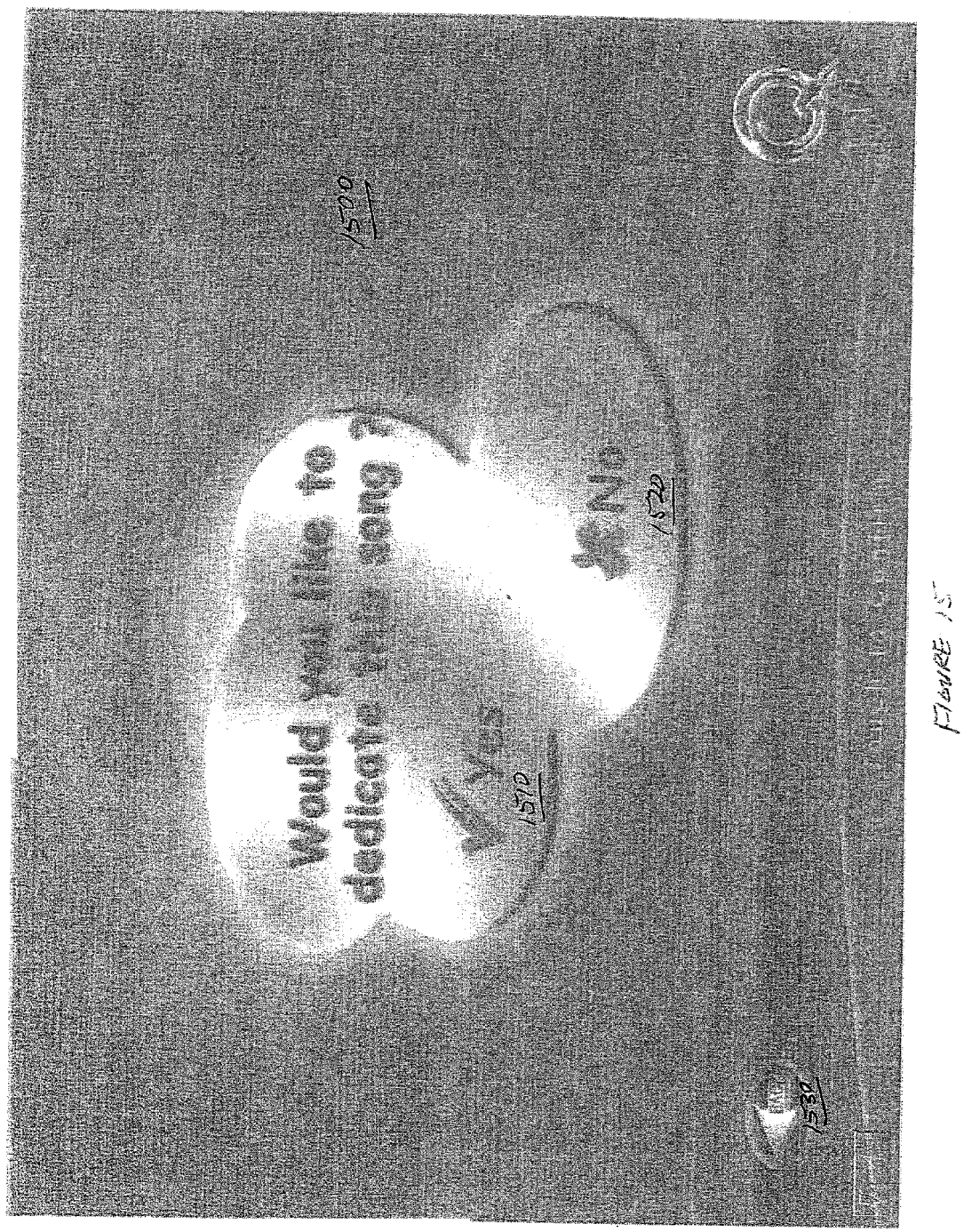

FIG. 15 illustrates a dedication decision screen 1500 that is presented after the customer has selected media for play. The dedication decision screen 1500 simply queries the customer as to whether he wishes to dedicate the song he has chosen to someone. A "yes" (button 1510) or "no" (button 1520) is a suitable response. The customer may wish to go back to an earlier screen by pressing a back button 1530.

Figure 16:
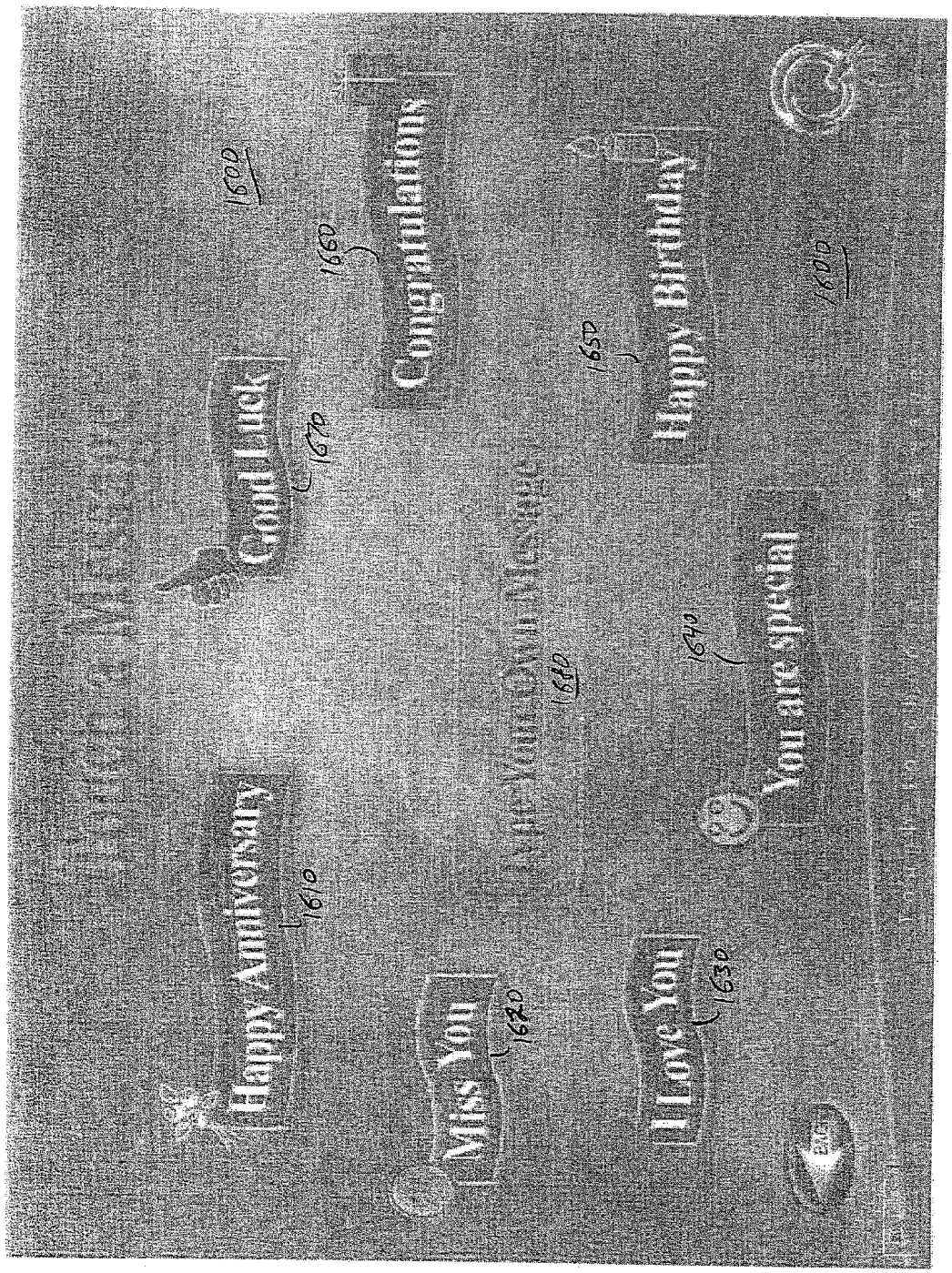

FIG. 16 illustrates a dedication message screen 1600 that is presented if the customer has selected the yes button 1510 of FIG. 15. Buttons 1610, 1620, 1630, 1640, 1650, 1660, 1670 are presented corresponding to several felicitous messages. The customer may wish to type his own message by touching a button 1680. The customer may wish to go back to an earlier screen by pressing a back button 1690.

Figure 17:
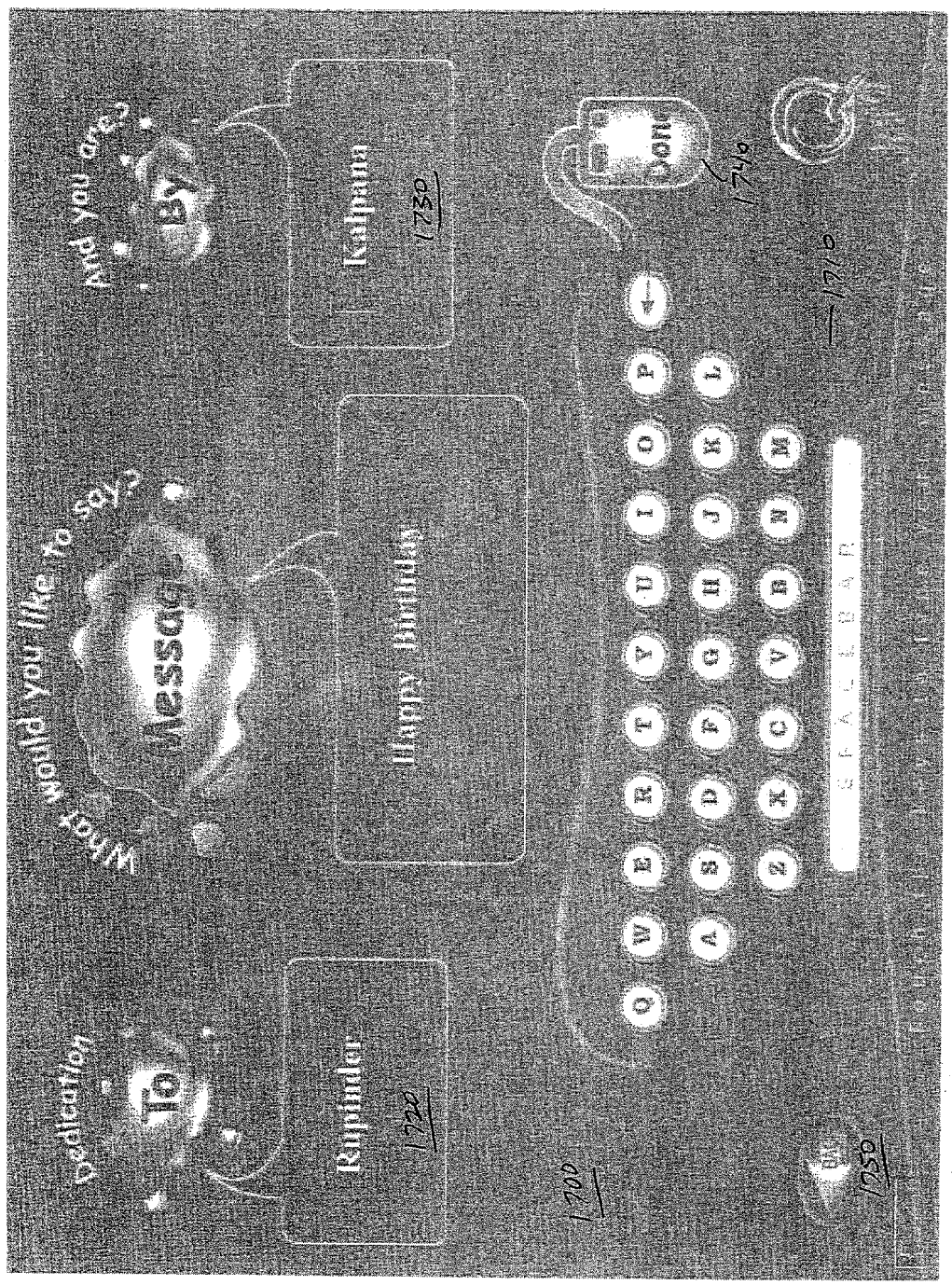

FIG. 17 illustrates a dedication name screen 1700 that is presented after the customer has pressed one of the buttons 1610, 1620, 1630, 1640, 1650, 1660, 1670 of FIG. 16. In this case, the customer has pressed the button 1650 corresponding to "happy birthday." Using a stylized keyboard 1710, the customer enters to and from information in respective fields 1720, 1730. When done, the customer touches a done button 1740. The customer may wish to go back to an earlier screen by pressing a back button 1750.

Figure 18:
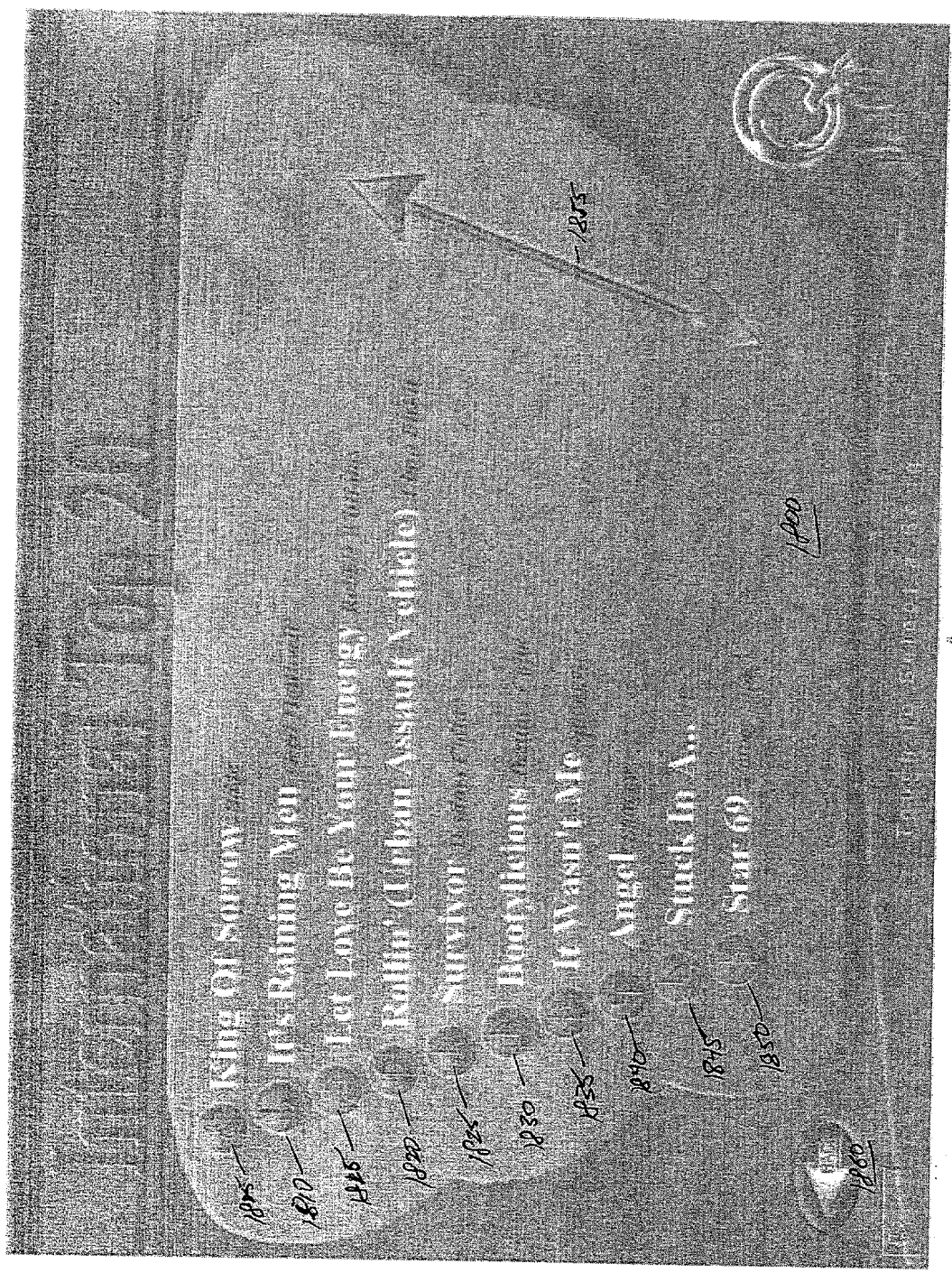

FIG. 18 illustrates an international top 20 screen 1800 that is presented after the customer touches the top 20 button 620 of FIG. 6. The international top 20 screen 1800 includes buttons 1805, 1810, 1815, 1820, 1825, 1830, 1835, 1840, 1845, 1850 to select respective ones of ten love songs. The international top 20 screen 1800 further includes a slider 1855 that the customer can drag to reveal further international top 20 songs. The customer may wish to go back to an earlier screen by pressing a back button 1860.

Figure 19:
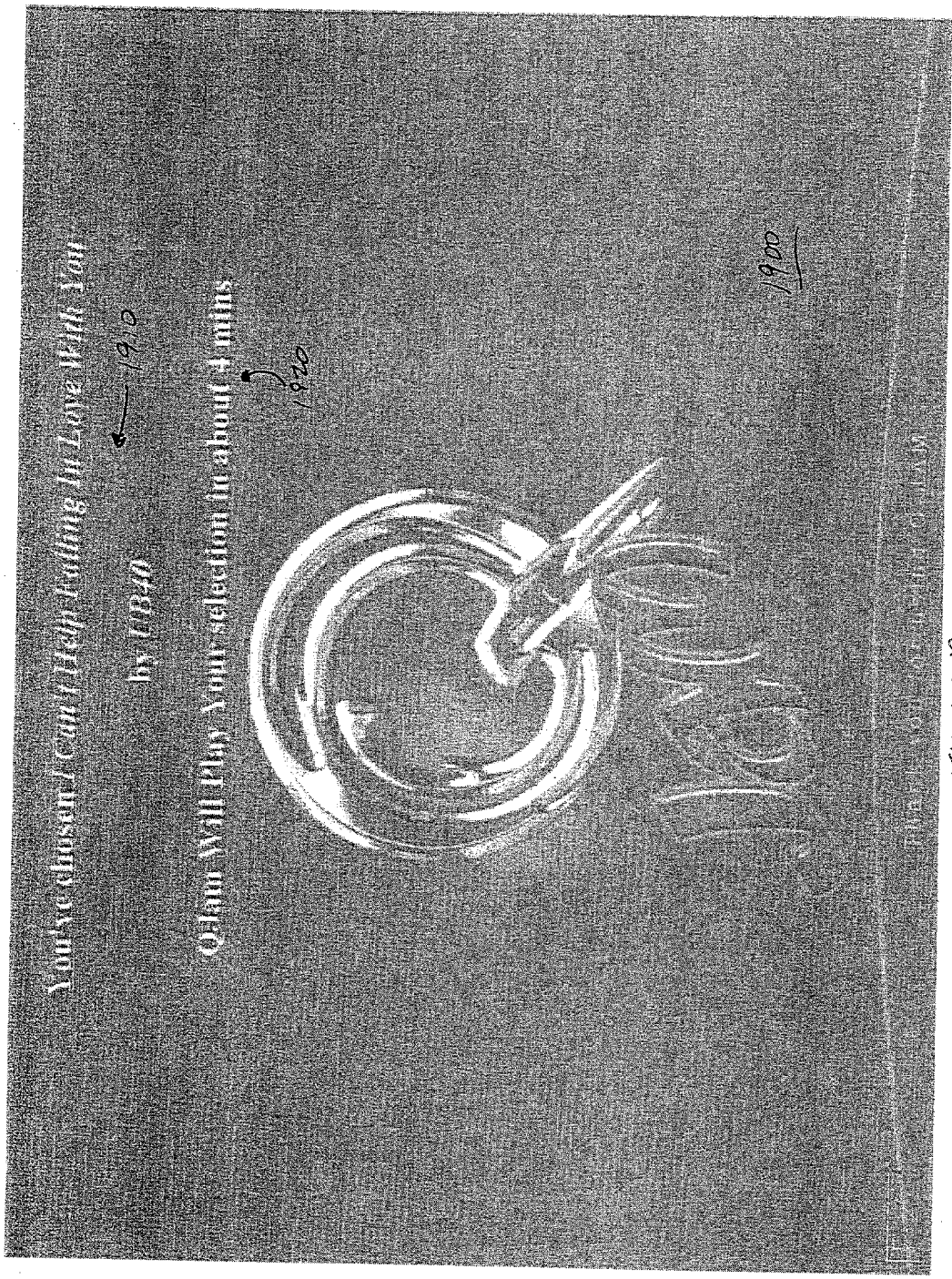

FIG. 19 concludes the screenshots and illustrates a play screen 1900 that is presented once a customer has selected media. The play screen 1900 sets forth text for the chosen media 1910 and an estimated time-remaining-until-play 1920.

Figure 20:
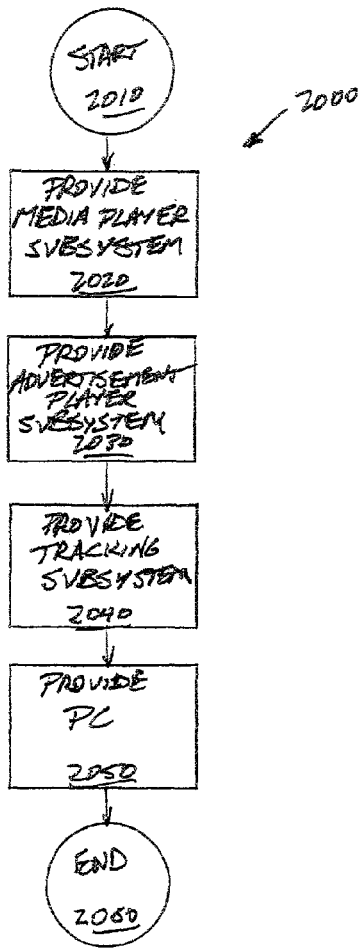
FIG. 20 illustrates a flow diagram of a method of manufacturing the media and advertisement player of FIG. 1.

Turning now to FIG. 20, illustrated is a flow diagram of a method, generally designated 2000, of manufacturing the media and advertisement player 120 of FIG. 1. The method begins in a start step 2010, wherein it is desired to make a media and advertisement player.

In a step 2020, a media player subsystem is provided that receives media from a remote system via the computer network and plays the media in response to customer requests.

Next, in a step 2030, an advertisement player subsystem is provided that receives advertisements and a corresponding advertising schedule from the remote system via the computer network and plays the advertisements according to the advertising schedule.

Then, in a step 2040, a tracking subsystem is provided that generates as-run logs containing records of a playing of the media and the advertisements and transmits the as-run logs to the remote system via the computer network.

Next, in a step 2050, a PC is provided to host the media player subsystem. The advertisement player subsystem and the tracking subsystem, the media and the advertisements are stored on a hard disk drive of the PC. The method 2000 ends in an end step 2060.

Figure 21:
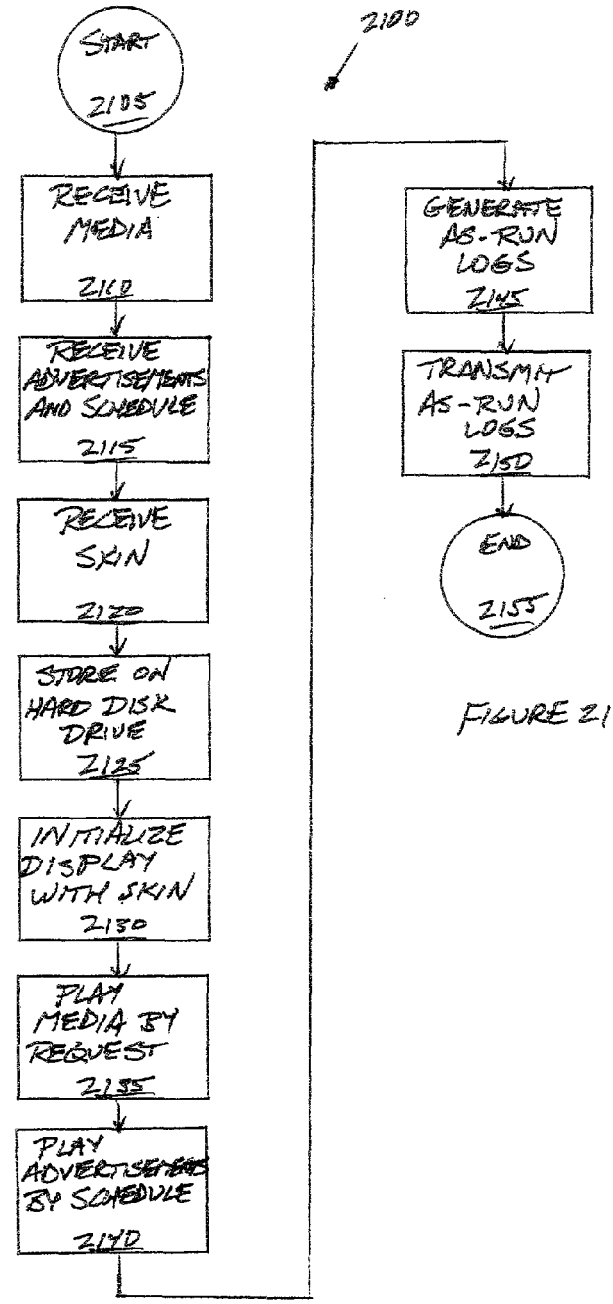
FIG. 21 illustrates a flow diagram of a method of playing media and advertisements and reporting the playing of the media and advertisements to a remote system.

Turning now to FIG. 21, illustrated is a flow diagram of a method, generally designated 2100, of playing media and advertisements and reporting the playing of the media and advertisements to a remote system.

The method 2100 begins in a start step 2105, wherein it is desired to load a particular media and advertisement player to make it ready for playing.

Thus, in a step 2110, media is received from a remote system via a computer network. In a step 2115, advertisements and a corresponding advertising schedule are received from the remote system via the computer network. Next, in a step 2120, a skin is received from the remote system via a computer network. Then, in a step 2125, the media, the advertisements and the skin are stored on a hard disk drive of a PC. Next, in a step 2130, a display is initialized using the skin. Then, in a step 2135, pieces of the media are played in response to customer requests. Next, in a step 2140, the advertisements are played according to the advertising schedule. Then, in a step 2145, as-run logs containing records of a playing of the media and the advertisements are generated. Next, in a step 2150, the as-run logs are transmitted to the remote system via a computer network. The method 2100 finally ends in an end step 2155.

Although the present invention has been described in detail, those skilled in the art should understand that they can make various changes, substitutions and alterations herein without departing from the spirit and scope of the invention in its broadest form.

What is claimed is:

1. For use with a computer network, a media and advertisement player, comprising:
    a media player that receives and stores media from a remote system via said computer network and plays stored media content in response to customer requests, said customer requests constrained by playback rules that select among media content to be distributed, received, and stored among a plurality of media players, wherein said media player receives and stores, according to said playback rules, at least some different distributed media content than another of said plurality of said media players, wherein said media is selected from the group consisting of: audio music, music videos, and skins;
    an advertisement player that receives advertisements and a corresponding advertising schedule from said remote system via said computer network that stores and plays said advertisements according to said advertising schedule, said advertising schedule being dependent upon play of a content of said media, wherein said advertising schedule is correlated to said stored media content, said stored media content constrained by said playback rules; and
    a tracking subsystem that generates as-run logs derived from customer requests containing records of a playing of said media and said advertisements and transmits said as-run logs to said remote system via said computer network, said as-run logs employed by said remote system to adjust said playback rules.

2. The media and advertisement player as recited in claim 1 further comprising a display that presents a graphical user interface.

3. The media and advertisement player as recited in claim 2 wherein said graphical user interface has a skin that is received from said remote system via said computer network.

4. The media and advertisement player as recited in claim 2 wherein said display is touch-sensitive.

5. The media and advertisement player as recited in claim 1 further comprising a personal computer, said media and said advertisements being stored on a hard disk drive of said personal computer.

6. The media and advertisement player as recited in claim 1 wherein said computer network is the Internet.

7. A method of manufacturing a media and advertisement player, comprising:
    providing a media player subsystem that receives and stores media from a remote system via said computer network and plays stored media content in response to customer requests, said customer requests constrained by playback rules that selects among media content to be distributed, received, and stored among a plurality of media players, wherein said media player receives and stores, according to said playback rules, at least some different distributed media content than another of said plurality of said media players wherein said media is selected from the group consisting of: audio music, music videos, and skins;
    coupling an advertisement player subsystem that receives advertisements and a corresponding advertising schedule from said remote system via said computer network that stores and plays said advertisements according to said advertising schedule on said advertisement player subsystem, said advertising schedule being dependent upon a play of a content of said media, wherein said advertising schedule is correlated to said stored media content, said stored media content constrained by said playback rules; and
    coupling a tracking subsystem that generates as-run logs containing records of a playing of contents of said media derived from customer requests and said advertisements and transmits said as-run logs to said remote system via said computer network to said media player subsystem from said media player subsystem, said as-run logs employed by said remote system to adjust said playback rules.

8. The method as recited in claim 7 wherein said media player subsystem and said advertisement player subsystem employ a display that presents a graphical user interface.

9. The method as recited in claim 8 wherein said graphical user interface has a skin that is received from said remote system via said computer network.

10. The method as recited in claim 8 wherein said display is touch-sensitive.

11. The method as recited in claim 7 further comprising providing a personal computer, said media and said advertisements being storable on a hard disk drive of said personal computer.

12. The method as recited in claim 7 wherein said computer network is the Internet.

13. For use with a computer network, a method of playing media and advertisements and reporting the playing of the media and advertisements to a remote system, comprising:
    receiving and storing media from a remote system via a computer network, wherein said media is selected from the group consisting of: audio music, music videos, and skins;
    receiving and storing advertisements and a corresponding advertising schedule from said remote system via said computer network;
    playing said media in response to customer requests, said customer requests constrained by playback rules that selects among media content to be distributed, received, and stored among a plurality of media players, wherein said media player receives and stores, according to said playback rules, at least some different distributed media content than another of said plurality of said media players according to said playback rules;

playing said advertisements according to said advertising schedule, said advertising schedule being dependent upon a play of content of said media, wherein said advertising schedule is correlated to said stored media content, said media content constrained by said playback rules;

generating as-run logs containing records of a playing of a content of said media and said advertisements; and transmitting said as-run logs containing records of a playing of contents of said media derived from customer requests to said remote system via a computer network, said as run logs employed by said remote system to adjust said playback rules.

14. The method as recited in claim 13 wherein said customer requests are received via a graphical user interface on a display.

15. The method as recited in claim 14 wherein said graphical user interface has a skin, said method further comprising receiving said skin from said remote system via a computer network.

16. The method as recited in claim 14 wherein said display is touch-sensitive.

17. The method as recited in claim 13 further comprising storing said media and said advertisements on a hard disk drive of a personal computer.

18. The method as recited in claim 13 wherein said computer network includes the Internet.

19. The player of claim 1, wherein said advertising schedule being dependent upon plays of selected content of said media further comprises said advertising schedule being based on a selection of content a first media but not from a selection of content of a second media.

20. The player of claim 1, wherein said advertising schedule is based on said given advertisement and its proximity to a content of said particular media being played.

21. The player of claim 1, wherein said advertising schedule is based on at least one aspect selected from the group consisting of:
 (1) a geographic location of said media player and said advertisement player;
 (2) an establishment type in which said media player and advertisement player are located;
 (3) a demographic of establishment in which said media and said advertisement player is located;
 (4) a time of a day;
 (5) a date;
 (6) a day of a week;
 (7) a month of a year; and
 (8) a season of a year.

* * * * *